US008977823B2

(12) United States Patent
ALexander et al.

(10) Patent No.: US 8,977,823 B2
(45) Date of Patent: Mar. 10, 2015

(54) STORE BUFFER FOR TRANSACTIONAL MEMORY

(71) Applicant: International Business Machines Corporation, Armonk, NY (US)

(72) Inventors: Khary J. ALexander, Poughkeppsie, NY (US); Christian Jacobi, Schoenaich (DE); Gerrit Koch, Ammerbuch (DE); Martin Recktenwald, Schonaich (DE); Timothy J. Slegel, Staatsburg, NY (US); Hans-Werner Tast, Weil im Schoenbuch (DE)

(73) Assignee: International Business Machines Corporation, Armonk, NY (US)

( * ) Notice: Subject to any disclaimer, the term of this patent is extended or adjusted under 35 U.S.C. 154(b) by 201 days.

(21) Appl. No.: 13/621,256

(22) Filed: Sep. 16, 2012

(65) Prior Publication Data

US 2014/0082293 A1    Mar. 20, 2014

(51) Int. Cl.
*G06F 13/00*    (2006.01)

(52) U.S. Cl.
USPC ........... 711/154; 711/122; 711/129; 711/135; 711/136; 710/39; 710/52; 710/310

(58) Field of Classification Search
CPC .............. G06F 3/0656; G06F 12/0811; G06F 12/0897; G06F 12/122
USPC ................. 711/117, 122, 129, 135, 136, 154; 710/39, 52, 310
See application file for complete search history.

(56) References Cited

U.S. PATENT DOCUMENTS

| 6,311,254 | B1 | 10/2001 | Kuttanna et al. |
| 2007/0050564 | A1 | 3/2007 | Gunna et al. |
| 2010/0332808 | A1 | 12/2010 | Adl-Tabatabai et al. |
| 2014/0040595 | A1* | 2/2014 | Tran ............................... 712/32 |

OTHER PUBLICATIONS

Chaudhry, "Rock: A High-Performance SPARC CMT Processor," Micro, IEEE, v. 29, Issue 2, pp. 6-16, 2009.

* cited by examiner

*Primary Examiner* — Reba I Elmore
(74) *Attorney, Agent, or Firm* — Thomas E. Tyson; Gregory K. Goshorn; Greg Goshorn, P.C.

(57) ABSTRACT

Provided are techniques for handling a store buffer in conjunction with a processor, the store buffer comprising a free list; a merge window; and an evict list; and logic, for, upon receipt of a T_STORE operation, comparing a first address associated with the T_STORE operation with a plurality of addresses associated with previous T_STORE operations, wherein the previous T_STORE operations are part of the same transaction as the T_STORE operation and the entries corresponding to the previous T_STORE operations are stored in the merge window; in response to a match between the first address and a second address, associated with a second T_STORE operation, of the plurality of addresses, merging a first entry corresponding to the first T_STORE operation with a second entry corresponding to the second T_STORE operation; and consolidating results associated with the first T_STORE operation with results associated with the second T_STORE operation.

22 Claims, 7 Drawing Sheets

STORE BUFFER FOR TRANSACTIONAL MEMORY

FIELD OF DISCLOSURE

The claimed subject matter relates generally to computer memory management and, more specifically, to techniques fir improving the efficiency of transactional memory.

SUMMARY

Provided are techniques for improving the efficiency of transactional memory. Many computer systems employ cache memory to speed data retrieval operations. Cache memory stores copies of data found in frequently used main memory locations. Accessing data from cache memory speeds processing because cache memory can typically be accessed faster than main memory. If requested data is found in cache memory it is accessed from cache memory; if requested data is not found in cache memory, the data is copied into cache memory and then accessed from the cache memory.

Multi-level cache is an architecture in which there are multiple cache memories. For example, a computing system may have three levels, i.e. an L1 cache, an L2 cache and an L3 cache. Typically in a multi-level cache configuration, L1 would be the smallest, and thus the easiest to search. If requested data is not found in L1 cache, the system searches L2 cache, which may be larger than L1 cache and thus take longer to search. In a similar fashion, if the data is not found in L2 cache, L3 cache is searched. Main memory is only search once a determination has been made that the requested data is not in any of L1, L2 or L3 cache. Of course, there are many different implementations of cache memory.

Provided are techniques for handling a store buffer in conjunction with a processor, comprising a store buffer, the store buffer comprising a free list; a merge window; and an evict list; and logic, for, upon receipt of a T_STORE operation, comparing a first address associated with the T_STORE operation with a plurality of addresses associated with previous T_STORE operations, wherein the previous T_STORE operations are part of the same transaction as the T_STORE operation and the entries corresponding to the previous T_STORE operations are stored in the merge window; in response to a match between the first address and a second address, associated with a second T_STORE operation, of the plurality of addresses, merging a first entry corresponding to the first T_STORE operation with a second entry corresponding to the second T_STORE operation; consolidating results associated with the first T_STORE operation with results associated with the second T_STORE operation to produce a consolidated result; and storing the consolidated result in the merge window in place of the second entry.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures.

DETAILED DESCRIPTION

Figure 1:
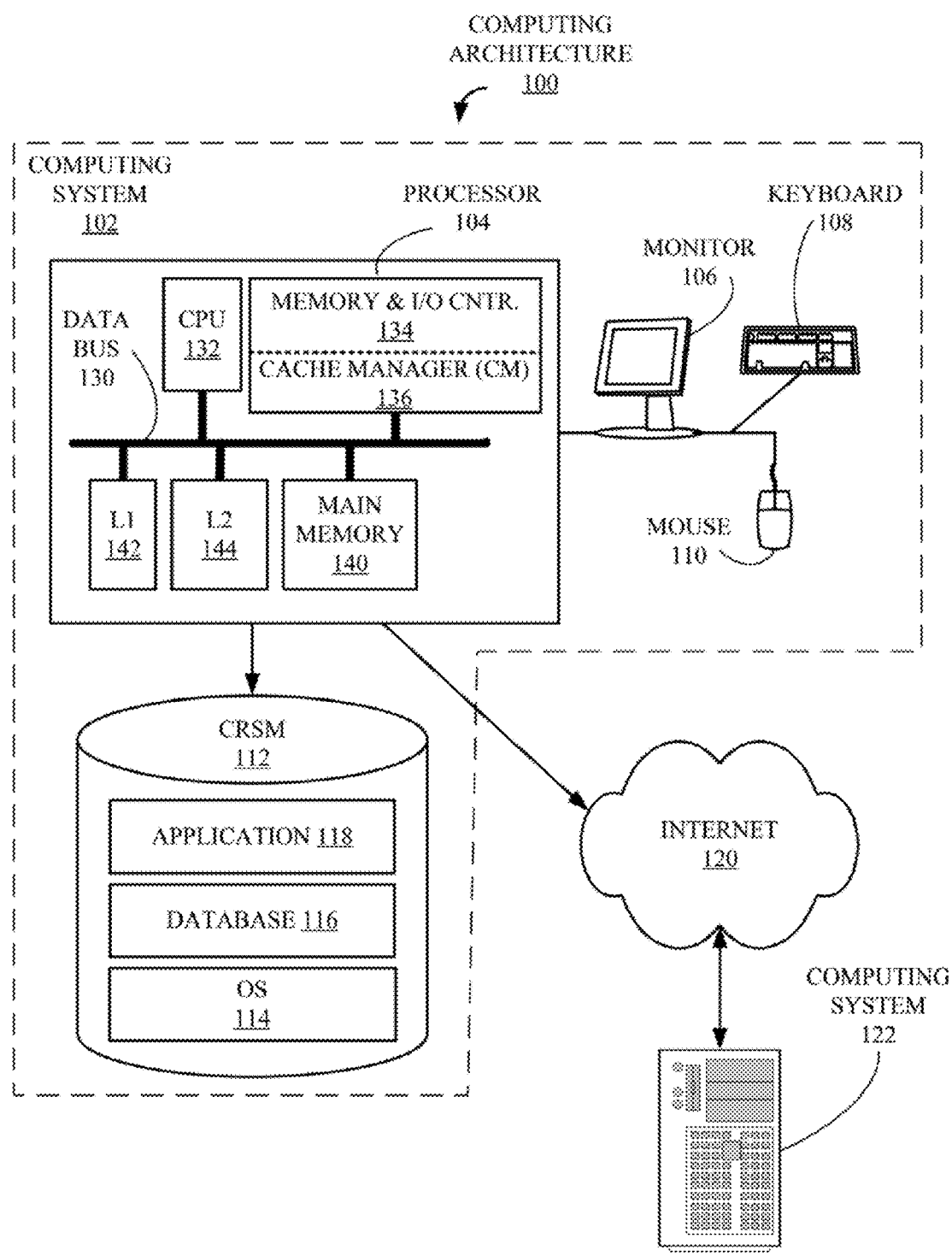
FIG. 1 is a computing architecture that may implement the claimed subject matter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection, having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational actions to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Turning now to the figures, FIG. 1 is a block diagram of an exemplary computing architecture 100 that may incorporate the claimed subject matter. A computing system 102 includes a processor 104, coupled to a monitor 106, a keyboard 108 and a pointing, device, or "mouse," 110, which together facilitate human interaction with computing system 102 and other elements of computing architecture 100. Also included in computing system 102 and attached to processor 104 is a computer-readable storage medium (CRSM) 112, which may either be incorporated into computing system 102 i.e. an internal device, or attached externally to computing system 102 by means of various, commonly available connection devices such as but not limited to, a universal serial bus (USB) port (not shown). CRSM 112 is illustrated storing some common components, i.e. an operating system (OS) 114, a database 116 and an application 118. It should be noted that a typical computing system 102 and CRSM 112 would typically store more than components 114, 116 and 118 but for the sake of simplicity only 114, 116 and 118 are illustrated and used as examples.

Processor 104 is illustrated including a data bus 130, a CPU 132, which may include one or more processing cores, a memory and input/output (I/O) controller (Cntr.) 134, a main memory 140, an L1 memory cache, or simply "L1," 142 and an L2 memory cache, or simply "L2," 144. Each of components 130, 132, 134, 140, 142 and 144 should be familiar to one with skill in the relevant arts. Included in memory & I/O control 134 is a cache manager (CM) 136. CM 136 implements the efficient utilization of main memory 140, L1 142 and L2 144 in accordance with the disclosed, technology by components such as, but not limited to, database 116 and application 118.

Computing system 102 and processor 104 are connected to the Internet 120, which is also connected to a second computing system 122. Although in this example, computing system 102 and computing system 122 are communicatively coupled via the Internet 120, they could also be coupled through any number of communication mediums such as, but not limited to, a local area network (LAN) (not shown). Further, it should be noted there are many possible computing system configurations, of which computing system 100 is only one simple example.

Figure 2:
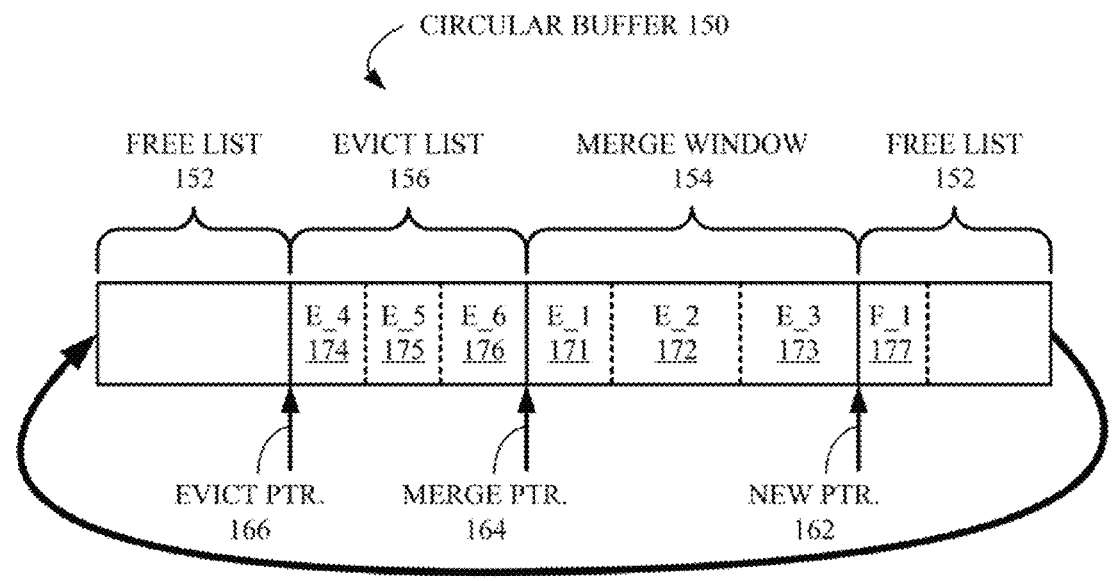
FIG. 2 is a block diagram of a circular cache memory that may implement the claimed subject matter.

FIG. 2 is a block diagram of a circular cache memory, or "circular buffer," 150 that may implement the claimed subject matter. Circular buffer 150 is divided into three (3) sections, i.e. a free list 152, a merge window 154 and an evict list 156. Simply stated, free list 152 is the area of circular buffer 150 that is available to use for the storing of newly received normal and transactional entries; merge window 154 stores both normal entries and transaction entries that are part of an atomic transaction, although not at the same time. In other words, during an ongoing transaction, merge window 154 stores transaction entries and, otherwise, stores normal entries. When a transaction ends successfully, transaction entries in merge window 154 are convened to normal entries. When a transaction begins, existing entries in merge window 154 are moved to evict window 156. Evict window 156 stores entries moved from merge window 154, some of which may correspond to completed transactions, i.e. ready to be committed to, in the following examples, database 114 (FIG. 1).

The actual position and size of each section 152, 154 and 156 may shift within circular buffer 150. Each section 152, 154 and 156 is defined at any particular time by a pointer, i.e. a new pointer (ptr.) 162, a merge pointer 164 and an evict pointer 166, respectively. In other words, in the case that entries are ordered in the example within circular buffer 150 from left to right, free list 152 is defined as the area of circular buffer 150 to the right of new pointer 162 and the left of evict pointer 166; merge window 154 is the area to the right of merge pointer 164 and the left of new pointer 162; and evict list 156 is the area to the right of evict pointer 166 and to the left of merge pointer 164. It should be noted that at system initialization, the circular buffer 150 is entirely free list 152 with all three pointer 162, 164 and 166 pointing to the same location.

Illustrated stored in circular buffer 150 are some examples of transaction entries, i.e. an E_1 171, an E_2 172 and an E_3 173, which are stored in merge window 154, and an E_4 174, an E_5 175 and an E_6 176, which are stored in evict list 156. In this illustration, solid lines are used to mark boundaries between sections 152, 154 and 156 and dotted lines are used to represent the boundaries between entries 171-176 within any particular section 152, 154 and 156. Entries 171-176 represent information related to ongoing transactions with the particular section of circular buffer 150 representing the state of the corresponding transaction entries 171-176. When a new transactional entry is required, memory, such as a F_1 177, is allocated from free list 152 and new pointer 162 is shifted to the right which would re-categorize F_1 177 as an entry in merge window 154.

Circular buffer 150 is designed so that entries do not necessarily be moved when their status changes. For example, entries in merge window 154 may be re-categorized as entries in evict list 156 simply by moving the location pointed to by merge pointer 164 to the right. For example, E_1 171 may be moved from merge window 154 to evict list 156 by moving merge pointer 164 one entry to the right. In a similar fashion, new entries in free list 152 may be re-categorized as entries in merge window 154 by moving new pointer 162 to the right and entries in evict list 156 may be re-categorized as entries in free list 152 by moving evict pointer 166 to the right. Of course, once a pointer 162, 164 or 166 has no room left on the right, the pointer 162, 164 and 166 may be moved to the left of circular buffer 150, which accounts for the circular nature of buffer 150. The use of circular buffer 150, sections 152, 154 and 156 and pointer 162, 164 and 166 are explained in more detail below in conjunction with FIGS. 4-9.

Figure 3:
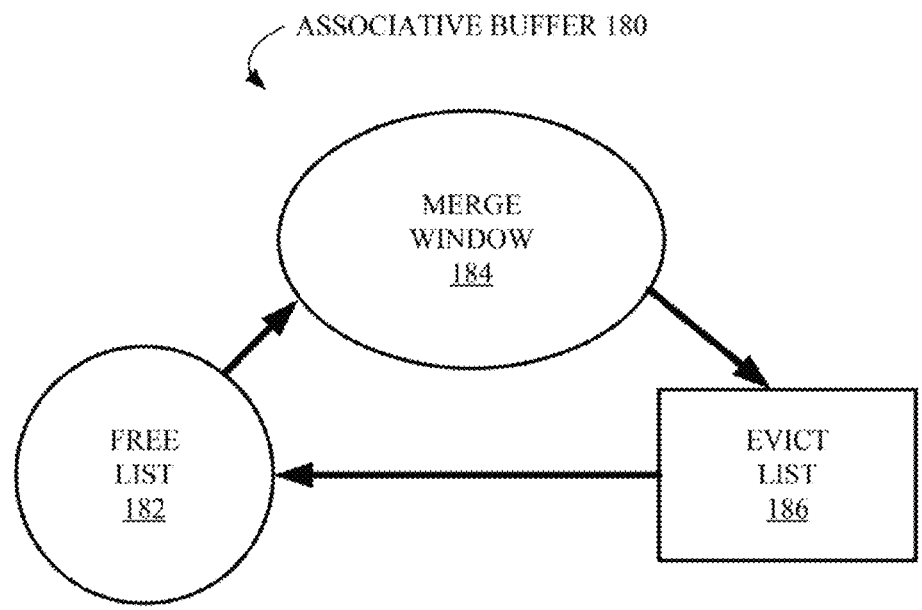
FIG. 3 is a block diagram of an associative cache memory that may implement the claimed subject matter.

FIG. 3 is a block diagram of an associative cache memory, or "associative buffer," 180 that, like circular buffer 150 (FIG. 2), may also be employed to implement the claimed subject matter. Unlike circular buffer 150, entries such as 171-174 (FIG. 2) may actually be moved from among a free list 182, a merge window 184 and an evict list 186. In the alternative entries may be stored in particular locations in memory and pointers to those locations moved among sections 182, 184 and 186. The arrows between sections 182, 184 and 186 represent one typical flow of transactions.

Figure 4:
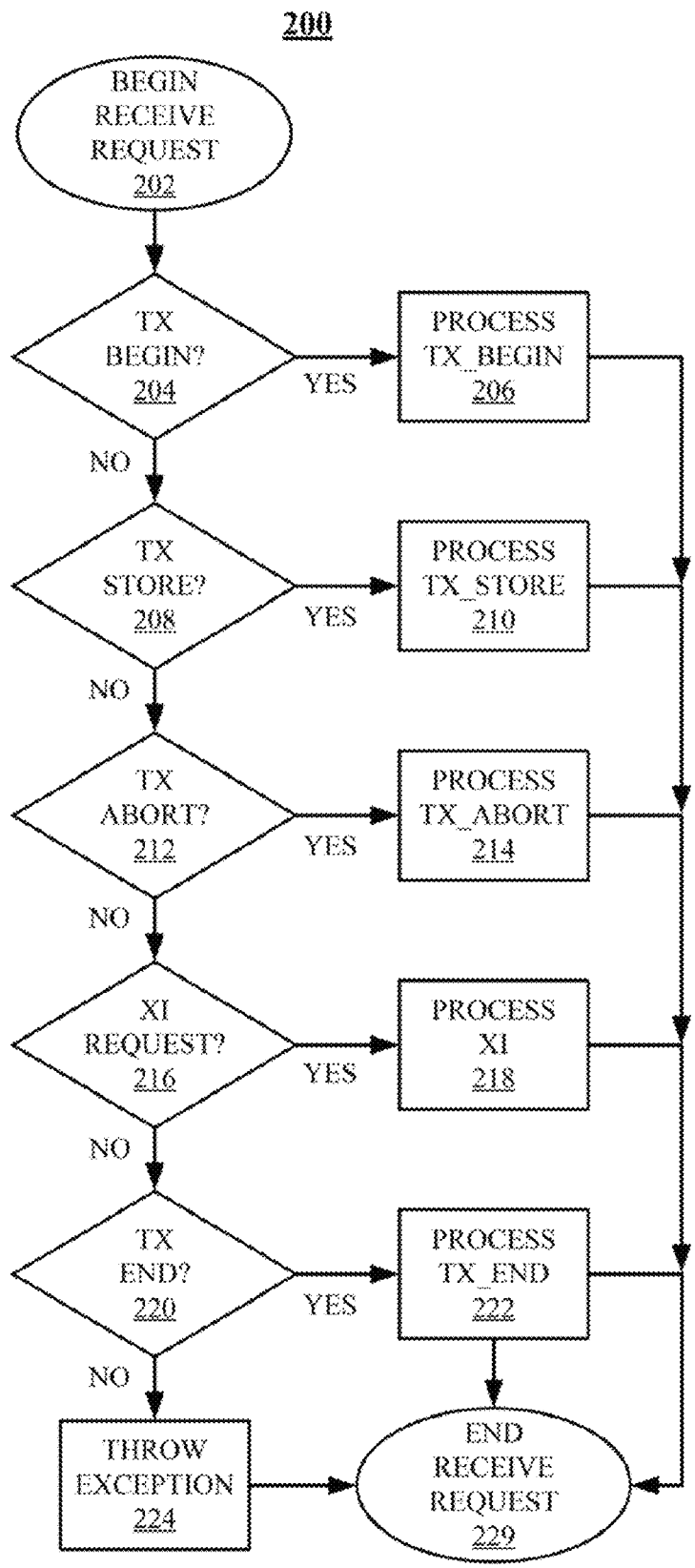
FIG. 4 is a flowchart of a "Receive Request" process that may implement aspects of the claimed subject matter.

FIG. 4 is a flowchart of a "Receive Request" process 200 that may implement aspects of the claimed subject matter. In the following example, logic associated with process 200 is stored in conjunction with CM 136 (FIG. 1) and executed by one or more processor cores (not shown) associated with memory & I/O controller 134 (FIG. 1 or CPU 132 (FIG. 1). Process 200 is initiated when a transaction request is received. For example, a transaction may be generated by application 116 (FIG. 1) with respect to database 114 (FIG. 1). Using database 114 as an example, typically, database transactions, which may be made up of numerous operations must be executed in an atomic fashion, i.e. either all are operations executed or database 116 is left in the same state as prior to the start of the transaction. Transaction operations used in the following examples include a "transaction begin," or "TX_BEGIN," operation; a "transaction store," or "TX_STORE," operation; a "transaction abort," or "TX_ABORT," operation; a "cross interrogation begin," or "XI," operation; and a transaction end," or "TX_END," operation. Those with skill in the relevant arts will understand the nature of atomic transaction and the transaction used in the following examples.

Process 200 starts in a "Begin Receive Request" block 202 and proceeds immediately to a "TX_BEGIN?" block. 204. During processing associated with block 204, a determination is made as to whether the transaction that initiated process 200 is a TX_BEGIN operation. If so, control proceeds to a "Process "TX_BEGIN" block 206, which is explained in more detail below in conjunction with FIG. 5. If not, control proceeds to a "TX_STORE?" 208. During processing associated with block 208, a determination is made as to whether the transaction that initiated process 290 is a TX_STORE operation. If so, control proceeds to a "Process "TX_STORE" block 210, which is explained in more detail below in conjunction with FIG. 6. If not, control proceeds to a "TX_ABORT?" 212.

During processing associated with block 212, a determination is made as to whether the transaction that initiated process 209 is a TX_ABORT operation. If so, control proceeds to a "Process "TX_ABORT" block 214, which is explained in more detail below in conjunction with FIG. 7. If not, control proceeds to a "XI Request?" 216. During processing associated with block 216, a determination is made as to whether the transaction that initiated process 290 is an XI operation. If so, control proceeds to a "Process XI" block 218, which is explained in more detail below in conjunction with FIG. 8. If not, control proceeds to a "TX_END?" 220. During processing associated with block 220, a determination is made as to whether the transaction that initiated process 200 is as TX_END operation. If so, control proceeds to a "Process "TX_END" block 222, which is explained in more detail below in conjunction with FIG. 9. If not, control proceeds to a "Throw Exception" 224.

During processing associated with block 224, an exception is generated because the transaction operation that initiated process 200 has not been determined to conform to one of the defined operations. Of course, other operations may also be defined and integrated into the disclosed technology. Finally, once processing has been completed with respect to blocks 206, 212, 216, 220 or 224, control proceeds to an "End Receive Request" block 229 in which process 200 is complete.

Figure 5:
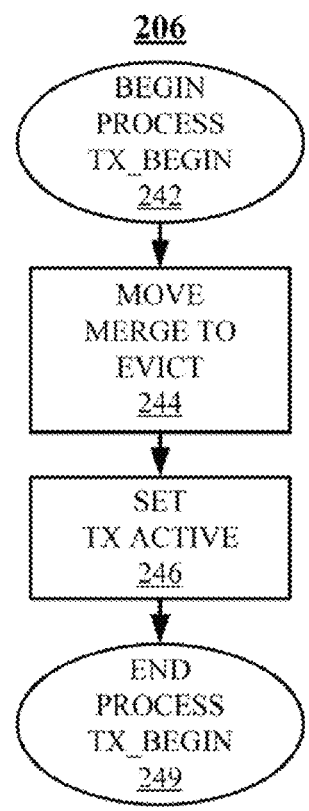
FIG. 5 is a flowchart of a "Process Transaction Begin (TX_BEGIN)" process that may implement aspects of the claimed subject matter.

FIG. 5 is a flowchart of a "Process TX_BEGIN" process 206, first introduced above in conjunction with FIG. 4, in more detail. As explained above in conjunction with FIG. 4, process 206 is executed in response to the receipt of a TX_BEGIN transaction and is indicative of the beginning of an atomic transaction comprised of a number of single transactions that all must be completed before any are committed. In the example described below in conjunction with FIGS. 5-9, circular buffer 150, free list 152, merge window 145, new pointer 162, merge pointer 164, evict pointer 166 and entries 171-177, all introduced above in conjunction with FIG. 2, are used to illustrate the claimed subject matter.

Process 206 starts in a "Begin Process TX_BEGIN" block 242 and proceeds immediately to a "Move Merge to Evict" block 244. During processing associated with block 244, transaction entries in merge window 154 (FIG. 2) are moved to evict list 156. In the alternative, entries in merge window 154 are simply marked as regular, or normal, stores rather than being marked as belonging to an uncompleted transaction and may be moved at another time. In other words, entries in merge window 154 may or may not come from previous transactions, i.e. they may be normal stores from outside the current transaction or from an already completed transaction. When a transaction successfully ends, the corresponding TX stores become normal stores (see 326, FIG. 9).

In circular buffer 150, the move is accomplished simply by moving merge pointer 164 to the location of new pointer 162. This update of merge pointer 164 has the effect of moving E_1-3 171-173 from merge window 154 to evict list 156. It should be understood that merge window acts as the store buffer for any transactions and that TX_BEGIN moves entries to evict list 156 because in the following scenario nested transaction are not permitted. In other words in this example, only one atomic transaction at a time may be conducted although in other embodiments nested transaction may be permitted. It should also be noted that entries in evict list 156 are determined to be ready to entered, in this example, in database 114 as part of a completed transaction. The exact timing of the movement of entries from evict list 156 to database 114 is not necessarily within the scope of the claimed subject matter but preferably should be completed in a timely manner so that circular buffer 150 remains less than full. Once entries, in this example, E_4-6 174-176, have been committed to database 114, evict pointer 166 is moved to the right of the last moved entry, E_6 166, such that the memory occupied by E_4-6 174-176 is effectively reassigned from evict list 156 to free list 152.

Figure 8:
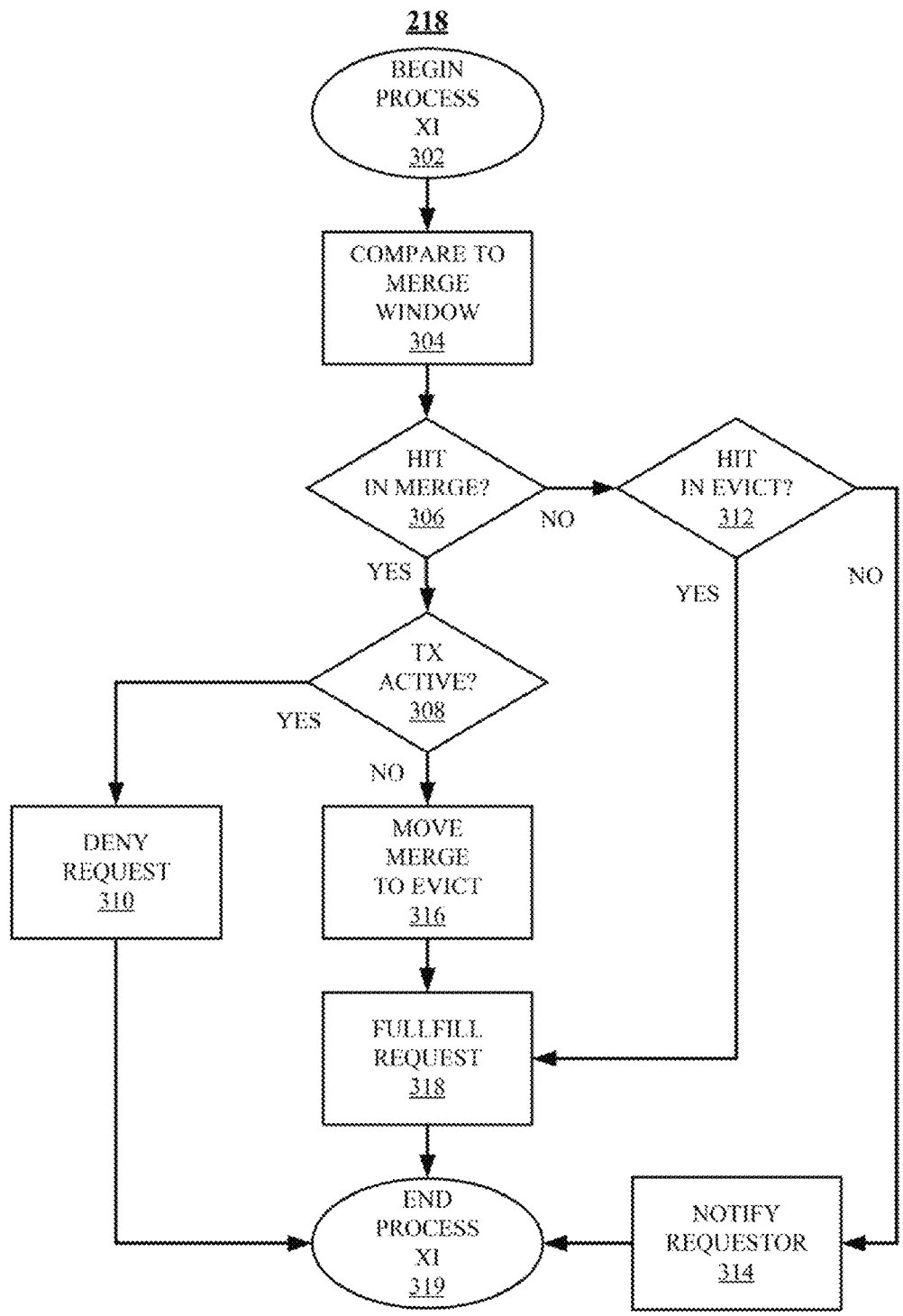
FIG. 8 is a flowchart of a "Process Cross interrogate (XI)" process that may implement aspects of the claimed subject matter.
Figure 9:
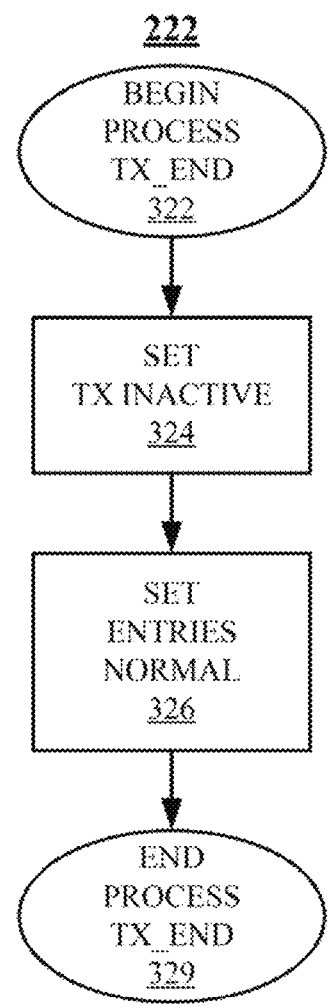
FIG. 9 is a flowchart of a "Process Transaction End (TX_END)" process that may implement aspects of the claimed subject matter.

During processing associated with a "Set TX Active" block 246, an indication is set that there is an "active" transaction in process (see 308, FIG. 8 and 324, FIG. 9). In other words, the TX_BEGIN operation received indicates that an atomic transaction has commenced and that more associated operations may be expected. Finally, during processing associated with an "End Process TX_BEGIN" block 249, process 206 is complete. In addition, it should be noted that once a transaction has commenced, i.e. a TX_BEGIN operation has been received, logic may be provided to prevent normal entries from being merged with entries associated with a TX_STORE operation prior to receiving a TX_END operation.

Figure 6:
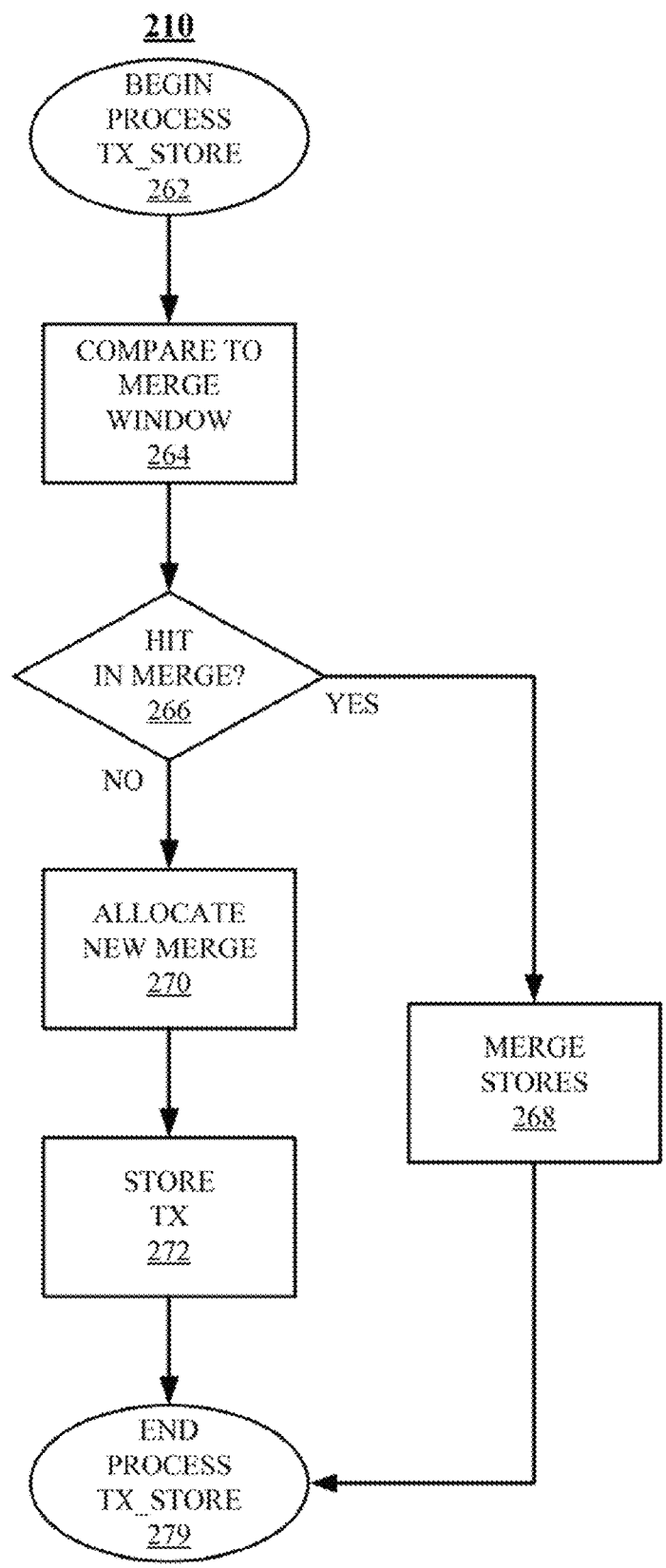
FIG. 6 is a flowchart of a "Process Transaction Store (TX_STORE)" process that may implement aspects of the claimed subject matter.

FIG. 6 is a flowchart of a "Process TX_STORE" process 210, first introduced above in conjunction with FIG. 4, in more detail. As explained above, a TX_STORE transaction is one operation of an atomic transaction. Process 210 starts in a "Begin Receive TX_STORE" block 262 and proceeds immediately to a "Compare to Merge Window" block 264.

During processing associated with block 264, the target address of the received transaction is compared to the target address of transactions already in merge window 154 (FIG. 2). During processing associated with a "Hit in Merge?" block 266, a determination is made as to whether or not the received transaction goes to the same address as another transaction in merge window 154. If so, during processing associated with a "Merge Stores" block 268, the received transaction and the stored transaction that shares a target address are merged.

If, during processing associated with block 266, a determination is made that the received transaction does not share a target address with any transactions in merge window 154, control proceeds to an "Allocate New Merge" block 270. During processing associated with block 270, a new entry is created in merge window 154. A new entry in merge window 154 is created by taking the first available entry, such as F_4 177 (FIG. 2), in free list 152 (FIG. 2) and moving new pointer 162 (FIG. 2) one entry to the right. During processing associated with a "Store TX" block 272, the current transaction is then stored in the new entry created in merge window during processing associated with block 270.

Finally, once stores have been merged during processing associated with block 268 or the current transaction has been stored during processing associated with block 272, control proceeds to an "End Process TX_STORE" block 279 during which process 210 is complete.

Figure 7:
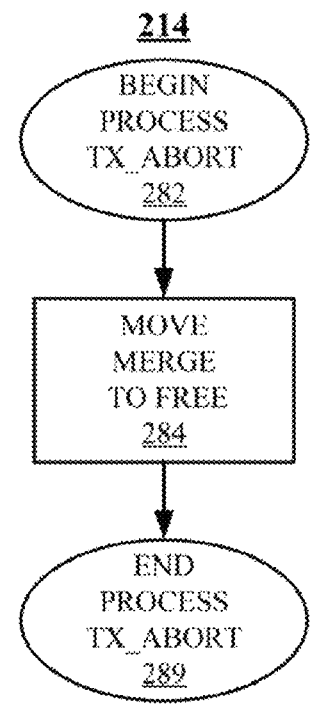
FIG. 7 is a flowchart of a "Process Transaction Abort (TX_ABORT)" process that may implement aspects of the claimed subject matter.

FIG. 7 is a flowchart of a "Process TX_ABORT" process 214, first introduced above in conjunction with FIG. 4, in more detail. Process 214 starts in a "Begin Process TX_ABORT" block 282 and proceeds immediately to a "Move Merge to Free" block 284. During processing associated with block 284, transaction stores in merge window 154 that correspond to the current transaction are moved back to free list 152. In circular buffer 150, this may be accomplished by simply moving new pointer 162. For example, if the current transaction is stored in E_2 172 and E_3 173, new pointer 162 is moved to a new position between E_1 171 and E_2 172. In the manner, the transaction operations stored in E_1 1.72 and E_3 173 are effectively and efficiently canceled. Finally, during processing associated with an "End Process TX_ABORT" block 289, process 214 is complete.

FIG. 8 is a flowchart of a "Process XI" process 218, first introduced above in conjunction with FIG. 4, in more detail. As explained above an XI request is a request from another process or transaction for access to information on a different transaction. Process 218 starts in a "Begin Process XI" block 302 and proceeds immediately to a "Compare to Merge Window" block 304. During processing associated with block 304, an address associated with the received XI request is compared to the target address of entries in merge window 154. During processing associated with a "Hit in Merge?" block 306, to determination is made as to whether or not the address associated with the received XI request matches a target address of an entry in merge window 154. If so, control proceeds to a "Transaction (TX) Active?" block 308. During processing associated with block 308, a determination is made as to whether or not the transaction with the matching address is part of a currently active transaction. If so, control proceeds to a "Deny Request" block 310. During processing associated with block 310, the process that made the XI request is notified that that request cannot be fulfilled due to an uncompleted transaction. Such a request cannot be fulfilled because of the possibility that the ongoing transaction may be rolled back or the requested entry may be merged (see 268, FIG. 6 prior to completion of the transaction. The requesting process may then either proceed without the requested information or make another attempt after a period of time. The requesting process may have a set maximum number of attempts or period of time before making a determination that the request cannot be fulfilled.

If, during processing associated with block 306, a determination is made that the address associated with the received XI request does not match a target address of an entry in merge window 154, control proceeds to a "Hit in Evict" block 312. During processing associated with block 312, a determination is made as to whether or not that the address associated with the received XI request matches a target address of an entry in evict window 156. If not, the requesting process is notified, during processing associated with a "Notify Requestor" block 314, that the request information is not stored in circular buffer 150.

If, during processing associated with block 308, a determination is made that the requested information is not part of an active transaction, control proceeds to a "Move Merge to Evict" block 316. During processing associated with block 316, the entry that a matching address is moved from merge window 154 to evict list 156. Once the entry is moved, e.g. by moving evict pointer 166 in circular buffer 150, or if a determination is made during processing associated with block 312 that the requested information is currently in evict list 165, control proceeds to a "Fulfill Request" block 318. During processing associated with block 318, the requested information is provided to the requesting process.

Finally, once a request has been denied during processing associated with block 310, a requester has been notified during processing associated with block 314 or a request has been fulfilled during processing associated with block 318, control proceeds to an "End Process XI" block 319 during which process 218 is complete.

FIG. 9 is a flowchart of a "Process TX_END" process 222, first introduced above in conjunction with FIG. 4, in more detail. Process 222 starts in a "Begin Process TX_END" block 322 and proceeds immediately to a "Set TX Inactive" block 324. During processing associated with block 324, entries in merge window 154 that correspond to the ongoing transaction are marked with indications that the current transaction is complete, i.e. an indicator in each entry is set to "inactive" and the entry is thus available to other processes (see 308, FIG. 8). During processing associated with a "Set Entries Normal" block 326, all entries associated with the transaction that has concluded are marked as normal store entries. In addition, logic may be provided to prevent any entry associated with an ongoing transaction from being moved from merge window 154 to evict window 156 prior to the receipt of a TX_END operation. Finally, control proceeds to an "End Receive TX_END" block 329 in which process 218 is complete.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A processor, comprising:
    a store buffer, the store buffer comprising:
        a free list;
        a merge window; and
        an evict list; and
    logic, for:
        upon receipt of a T_STORE operation, comparing a first address associated with the T_STORE operation with a plurality of addresses associated with previous T_STORE operations, wherein the previous T_STORE operations are part of the same transaction as the T_STORE operation and the entries corresponding to the previous T_STORE operations are stored in the merge window; and
        in response to a match between the first address and a second address, associated with a second T_STORE operation, of the plurality of addresses, merging a first entry corresponding to the first T_STORE operation with a second entry corresponding to the second T_STORE operation.

2. The processor of claim 1, the logic for merging of the first entry with the second entry comprising logic for:
    consolidating results associated with the first T_STORE operation with results associated with the second T_STORE operation to produce a consolidated result; and
    storing the consolidated result in the merge window in place of the second entry.

3. The processor of claim 1, further comprising logic for excluding, upon receipt of a T_BEGIN, each entry of a plurality of entries currently in the merge buffer from the merging associated with subsequent T_STORE operations.

4. The processor of claim 1, further comprising logic for preventing the entries associated with the transaction from moving from the merge window prior to receipt of a T_END operation corresponding to the transaction.

5. The processor of claim 1, further comprising logic for removing the entries associated with the transaction form the merge window in response to a receipt of a T_ABORT operation.

6. The processor of claim 1, further comprising:
    upon receipt of a T_END operation, promoting each entry associated with the transaction from a pending operations to normal operations; and
    enabling subsequent operations to merge with entries associated with normal operations until receipt of a T_BEGIN operation.

7. The processor of claim 1, further comprising logic, for:
    receiving a T_END operation; and
    in response to the T_END operation, changing the state of pending operations in the store buffer to normal.

8. The processor of claim 7, the store buffer further comprising:
    an evict list pointer; and
    the processor further comprises logic for moving each entry from the merge window to the evict list by moving the evict list pointer.

9. The processor of claim 1, wherein the store buffer is a circular buffer.

10. The processor of claim 1, wherein the store buffer is a fully associative buffer.

11. A method, comprising:
    receiving a T_STORE operation;
    comparing a first address associated with the T_STORE operation with a plurality of addresses associated with previous T_STORE operations stored in a merge buffer, wherein the previous T_STORE operations are part of the same transaction as the T_STORE operation;

in response to a match between the first address and a second address, associated with a second T_STORE operation, of the plurality of addresses, consolidating results associated with the first T_STORE operation with results associated with the second T_STORE operation to produce a consolidated result; and storing the consolidated result in the merge window in place of the second entry.

12. The method of claim 11, further comprising excluding each entry of a plurality of entries currently in the merge buffer from the merging associated with subsequent T_STORE operations in response to receiving a T_BEGIN operation.

13. The method of claim 11, further comprising preventing the entries associated with the transaction from moving from the merge window prior to receipt of a T_END operation corresponding to the transaction.

14. The method of claim 11, further comprising removing the entries associated with the transaction form the merge window in response to a receipt of a T_ABORT operation.

15. the method of claim 11, further comprising;
promoting each entry associated with the transaction from a pending operation to normal operation in response to a receipt of a T_END operation; and enabling subsequent merging of entries associated with normal operations until receipt of a T_BEGIN operation, 16. The method of claim 11, further comprising, in response to receiving a T_END operation, changing the state of pending operations in the store buffer to normal.

17. A computer programming product, comprising:
a non-transitory computer-readable storage medium; and
logic, stored on the computer-readable storage medium for execution on a processor, for.
receiving a T_STORE operation;
comparing a first address associated with the T_STORE operation. with a plurality of addresses associated with previous T_STORE operations stored in a merge buffer, wherein the previous T_STORE operations are part of the same transaction as the T_STORE operation;

in response to a match between the first address and a second address, associated with a second T_STORE operation, of the plurality of addresses, consolidating results associated with the first T_STORE operation with results associated. with the second T_STORE operation to produce a consolidated result.; and storing the consolidated result in the merge window in place of the second entry.

18. The computer programming product of claim 17, the logic further comprising logic for excluding each entry of a plurality of entries currently in the merge buffer from the merging associated with subsequent T_STORE operations in response to receiving a T_BEGIN operation.

19. The computer programming product of claim 17, the logic further comprising logic for preventing the entries associated with the transaction from moving from the merge window prior to receipt of a T_END operation corresponding to the transaction.

20. The computer programming product of claim 17, the logic further comprising logic for removing the entries associated with the transaction form the merge window in response to a receipt of a T_ABORT operation.

21. The computer programming, product of claim 17. the logic further comprising logic for:
promoting each entry associated with the transaction from a pending operation to normal operation in response to a receipt of a T_END operation; and enabling subsequent merging of entries associated with normal operations until receipt of a T_BEGIN operation.

22. The computer programming product of claim 17, the logic further comprising logic for changing the state of pending operations in the store buffer to normal in response to receiving a T_END operation.

* * * * *